United States Patent [19]

Riley

[11] 4,146,121
[45] Mar. 27, 1979

[54] CLUTCH OR BRAKE MECHANISM
[75] Inventor: David Riley, Oldham, England
[73] Assignee: Platt Saco Lowell Limited, Helmshore, England
[21] Appl. No.: 763,441
[22] Filed: Jan. 28, 1977
[51] Int. Cl.² .......................................... F16D 27/07
[52] U.S. Cl. .......................... 192/84 A; 192/89 R; 188/72.3
[58] Field of Search ................. 192/84 A, 84 C; 188/72.3, 161, 163

[56] References Cited
U.S. PATENT DOCUMENTS 3,262,530  7/1966  Maroldt et al. .................. 192/84 A
3,978,953  9/1976  Miller ............................ 192/84 A

*Primary Examiner*—Granville Y. Custer, Jr.
*Attorney, Agent, or Firm*—Donald H. Feldman

[57] ABSTRACT

In a clutch or brake mechanism of the type comprising two parts in coaxial relationship and an armature co-rotatably coupled with one of the parts and movable under magnetic forces for frictionally engaging the other part, a resilient restoring member for biassing the armature out of engagement with the other part comprises a continuous planar loop having two lobe portions which engage lugs bent from the plane of the armature and interconnecting portions which engage shoulders provided on said one part.

10 Claims, 2 Drawing Figures

CLUTCH OR BRAKE MECHANISM

FIELD OF INVENTION

The present invention relates to coupling devices which may comprise either clutch or brake mechanisms, particularly to known clutch or brake mechanisms in which two clutch parts are mounted in coaxial relationship to each other and are non-displaceable in an axial direction. An axially displaceable armature is arranged between them and carried by one of them and arranged to move axially, upon energization by electromagnetic means, from a disengaged position in which it is out of engagement with the other of the clutch parts to an engaged position in which it engages said other of the clutch parts.

DESCRIPTION OF PRIOR ART

In some electromagnetic clutch or brake mechanisms no means are provided to return the armature to the disengaged position upon de-energization of said electromagnetic means which may cause in some instances a disadvantage owing to the creation of residual torque by the frictional contact between the armature and the frictionally engaging clutch part. To overcome this disadvantage it has been proposed to employ resilient armature restoring elements for axially restoring the armature to the disengaged position upon de-energization of the electromagnetic means. Further disadvantages arise when a clutch or brake mechanism is of a miniature type when locating and securing the resilient armature restoring elements becomes difficult.

In some previously designed miniature clutches items such as tiny screws, rivets and circlips have been used to secure the armature restoring element, the size of the securing means making assembly and part replacement extremely difficult. Close tolerances in drilling securing holes and also in securing armature restoring elements is also necessary. Some previous miniature clutches and brakes have utilised a two part drive element in order to accommodate the armature restoring element. Such restoring elements have usually been cranked or bent to pre-load them to obtain disengagement.

In miniature clutches of this type, the armature travel is limited by the restrictive effect on the armature restoring element of the fastening by screws or rivets, in that part of the element is trapped by the screws or rivets thus reducing its flexibility.

SUMMARY OF THE INVENTION

It is one object of the invention to provide a clutch or brake mechanism which, particularly in its miniaturized form, has an armature restoring spring which is simple and inexpensive and furthermore can be readily removed and replaced without the use of fixing elements such as screws. According to the invention the resilient member comprises a loop having at least two lobe portions connected by an interconnecting portion, the lobe portions engaging the armature and the interconnecting portion engaging one of the parts of the coupling device.

In a preferred embodiment, the coupling element has provided lugs each engaging a respective one of the lobe portions, the interconnecting portion engaging shoulders provided on said one part. Preferably the shoulders are axially spaced from the position of engagement of the lobe portions with the lugs so that the resilient member is flexed in the inoperative position of the coupling element. In this way the resilient member can be simply clipped over the lugs and the shoulders to enable ready assembly and removal.

Preferably the resilient member used in the clutch or brake is of substantially square cross-section and is formed by photo-etching from a sheet of spring steel.

DESCRIPTION OF THE PREFERRED EMBODIMENT

Figure 1:
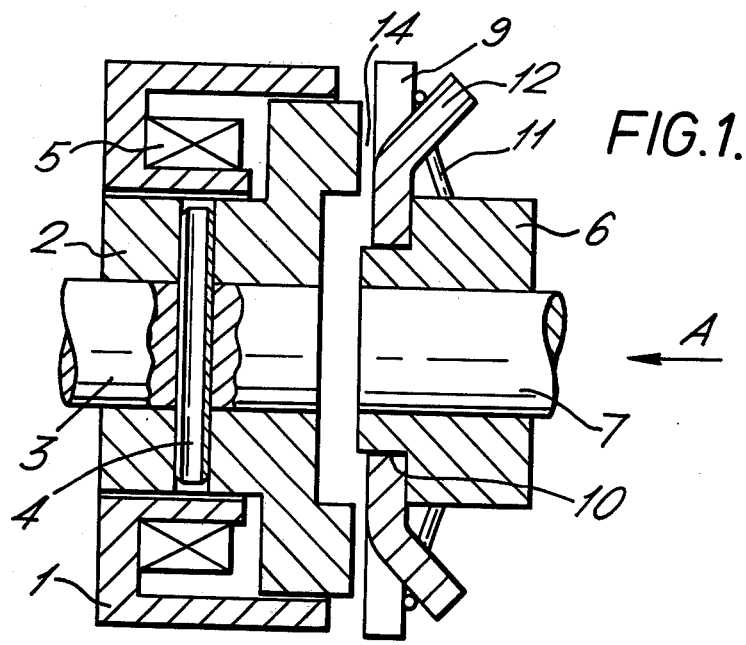
FIG. 1 is a sectional side elevation of a clutch mechanism according to the invention.
Figure 2:
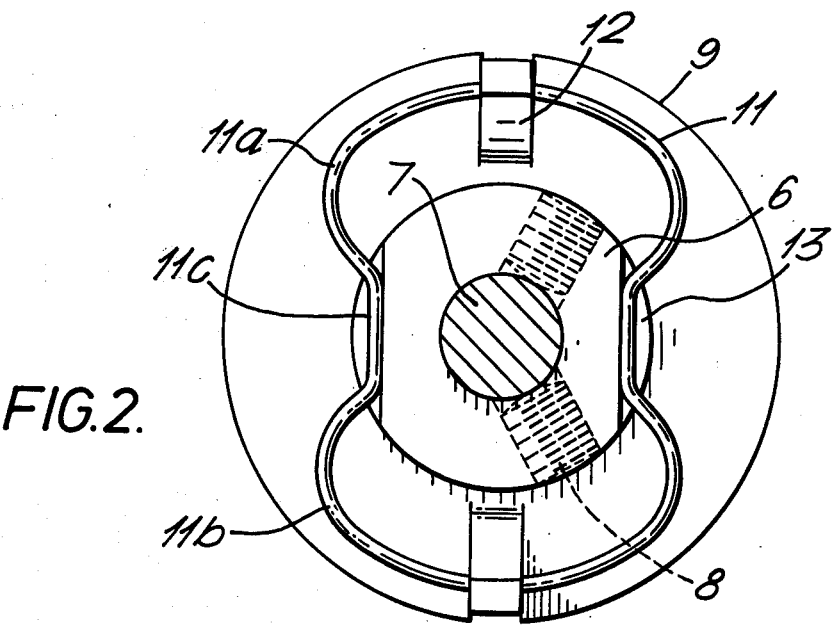
FIG. 2 is an end elevation view in the direction of arrow 'A' showing the armature and release spring assembly.

Referring to FIGS. 1 and 2 a fixed stator body 1 forming part of the clutch housing rotatably supports a magnetizable rotor 2 co-rotatably mounted on a first shaft 3 by spring pin 4. The stator body 1 houses an energizing coil 5 which, when energized, sets up a magnetic flux in the rotor 2 at an axially directed face 14. A drive boss 6 is secured to a second shaft 7 by screws 8 (FIG. 2). An armature 9 is mounted upon the drive boss 6 such that it may slide axially but is prevented from rotation relative to the drive boss 6 by co-operation with the square cross-section of the drive boss 6 at a portion 10. Other means to prevent rotation whilst permitting axial movement could be used such as splines.

A spring 11 of continuous loop configuration having two radially opposed lobed portions 11a and 11b interconnected by two parallel substantially straight waisted portions 11c is arranged so that each lobe passes behind a respective one of two lugs 12 formed radially oppositely on the armature 9. The spring 11 is such that in its unflexed state it is planar. The lugs 12 are formed by cutting two parallel slots from the periphery of the armature in an inward direction and bending the rectangular portion so formed out of the plane of the armature. The lobed portions 11a, 11b are arranged symmetrically relative to the axis so as to apply an even force to the armature to prevent binding. The engagement of the lobed portions 11a, 11b with the lugs 12 is arranged to be adjacent the periphery of the armature, to provide the maximum flexibility of the spring 11. Each waisted portion 11c is arranged to engage in a respective one of two recesses 13 providing shoulders on the drive boss 6 (FIG. 2) axially spaced from engagement of the lobes 11a, 11b with the lugs 12. In this way the resilience of the spring 11 biasses the armature 9 away from the magnetizable rotor 2 when the coil 5 is de-energized. Each waisted portion 11c may be arcuately shaped to engage a round portion of the drive boss.

When assembling the spring 11 to the armature and drive boss it is simply clipped over the lugs 12 and due to its continuous loop configuration assumes its operating position on the assembly. The lugs 12 do not restrict the resilience of the spring 11 by any detrimental amount and a large degree of armature travel between operative and inoperative positions is obtained.

Although the width of the lobed portions 11a, 11b is as shown greater than the spacing of the interconnecting portions 11c to provide greatest resilience, in an alternative embodiment the width may be the same as the spacing of the interconnecting portions or may even be less.

Upon energization of coil 5 the magnetic flux set up in the rotor 2 attracts the armature 9 and pulls it into frictional engagement with the rotor faces 14, overcoming the resilience of the spring 11, and as a result a drive is transmitted to the drive boss 6 and second shaft 7. Upon de-energization of the coil 5 the armature 2 returns to the disengaged position as shown in FIG. 1 under the restoring force of the spring 11.

The resilient spring may be made for example of spring wire such as piano wire. Such a spring configuration could be joined at a convenient part of its periphery. Preferably however the spring is photo-etched from a sheet of spring steel and therefore its resultant section is substantially square. A suitable spring could also be made from a plastics material.

Although there is disclosed a spring having two lobed portions in its configuration a spring having three or more lobes symmetrically arranged about the axis could be used in certain clutch or brake arrangements where greater restoring force is required.

The invention therefore provides a novel clutch or brake mechanism of simple construction. The use of a continuous loop type of spring in combination with lugs on the armature avoids the necessity of close tolerances in the manufacture of the locating means. Assembly, removal or replacement of the spring can be readily effected.

We claim:

1. In a coupling device comprising first and second coupling parts arranged in spaced coaxial relationship, a coupling element mounted coaxially therebetween and axially movable between an operative position in which said coupling element establishes an interconnection between said first and second coupling parts and an inoperative position in which such interconnection is removed, actuating means for moving said coupling element to said operative position, and resilient restoring means for biassing said coupling element into said inoperative position, the improvement comprising said resilient restoring means including a resilient loop member, having a plurality of lobe portions interconnected by a like plurality of substantially straight portions, in releasable abutting engagement with said first coupling part and said coupling element, wherein said resilient loop member is in a flexed condition, and wherein said lobes and substantially straight portions thereof are substantially coplanar when said loop member is in an unflexed condition.

2. The improvement as in claim 1, wherein lugs are provided on said coupling element, each engaging a respective one of said lobe portions, and wherein shoulders are provided on said first coupling part, each engaging a respective one of said interconnecting portions, said shoulders being axially spaced from the position of engagement of said lobe portions with said lugs so that said resilient loop member is in said flexed condition in said inoperative position of said coupling element.

3. The improvement as in claim 2, wherein the lugs are formed in the coupling element by two pairs of slots cut in the body of the coupling element with the portion so formed being bent out of the plane of the coupling element.

4. In a coupling mechanism comprising first and second couplable parts arranged in coaxial relationship and a coupler element therebetween arranged coaxially therewith, said coupler being axially displaceable into and out of abutting engagement with said second part, moving means for displacing said coupler into engagement with said second part, and interconnecting and biassing means for interconnecting said coupler with said first part and for biassing said coupler out of engagement with said second part, the improvement comprising a subcombination comprising said first part, said coupler element and said interconnecting and biassing means, wherein said coupler element and said first part each have a plurality of abutment surfaces, and wherein said interconnecting and biassing means includes a resilient element resiliently interconnecting said first part and said coupler element solely by detachable, abutting engagements with said abutment surfaces.

5. The improvement as in claim 4, wherein said resilient element is a loop spring having a plurality of lobe portions projecting therefrom and a like plurality of substantially straight portions interconnecting said lobe portions.

6. The improvement as in claim 5, wherein said lobe and substantially straight portions are substantially coplanar when in an unflexed condition.

7. The improvement as in claim 5, wherein said lobe portions of said loop spring are in detachable, abutting engagement with said abutment surfaces of said coupler element and said substantially straight portions of said loop spring are in detachable, abutting engagement with said first part.

8. The improvement as in claim 7, wherein said loop spring is in a flexed condition.

9. The improvement as in claim 7, wherein each of said abutment surfaces of said coupler element is at an ear projecting from a planar surface of said coupler element, which ear faces away from said second part.

10. The improvement as in claim 7, wherein said planar abuttment surfaces of said first couplable part are cut out shoulders.

* * * * *